Inventors
Claude Oudet
Gérard Lallement
By Stevens, Davis, Miller & Mosher
Attorneys Inventors
Claude Oudet
Gérard Lallement
By Stevens Davis Miller & Mosher
Attorneys Inventors
Claude Oudet
Gérard Lallement
By Stevens, Davis, Miller & Mosher
Attorneys

United States Patent Office 3,431,808
Patented Mar. 11, 1969

3,431,808
TORSION-OPERATED OSCILLATORS

Claude Oudet and Gérard Lallement, Besancon, France, assignors to Société Jaz S.A., Paris, France Filed Feb. 3, 1965, Ser. No. 430,048
Claims priority, application France Feb. 3, 1964, 962,412
U.S. Cl. 84—457 13 Claims
Int. Cl. G10g *7/02;* H03b *5/30*

ABSTRACT OF THE DISCLOSURE

A torsion-operated tuning fork, comprising a pair of frame members joined by a wire having its two ends secured in the frame members. At least one centering tube is mounted to the wire. An oscillator is supported on the centering tube or tubes. The oscillator includes a flexible member interconnecting two oscillatory masses, at least one detector member and at least one energizing member fixed on the oscillator for imparting to the flexible member a torsion force and maintaining the force thereon. The invention also includes an oscillator composed of a flexible member connecting a pair of oscillatory masses having in its median plane a thin disc provided with equidistant dimples spaced around its periphery.

Figure 2:
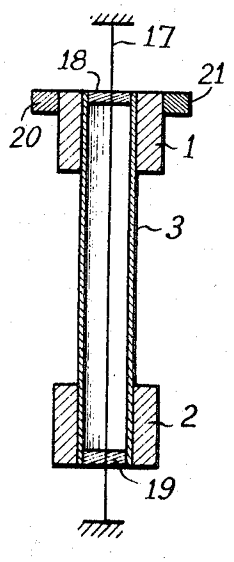

In the study and development of torsion-operated oscillators, attempts have been made to approach the perfect oscillator, which may be envisaged as a conservative, vibrating system, isolated in space. From the practical point of view, this has signified attempts to produce a device capable of satisfying two criteria, i.e. on the one hand to have a total energy loss of zero and, on the other hand, a movement and a kinetic moment produced at fixed observation points which is also zero.

It is a further object of the invention, to provide a tuning fork constituted by a flexible member connecting two oscillating masses, produced in the form of an oscillator having a kinetic moment of zero, not by means of two more or less independent oscillators, for which it is necessary to respect equal conditions of frequency, amplitude and phase opposition, particularly in the case of a conventional U-shaped flexing tuning fork, but by a single vibrating device, which fulfils the above desiderata without compromise. On the other hand, the suspension of this oscillator by one or more wires connected to the latter by at least one centering tube, enables low energy losses to be obtained, together with a good insensitivity to disturbances.

A torsion-operated tuning fork according to the invention enables the absorbtion sources to be reduced. So far as the internal friction of the oscillator is concerned, it must be noted that, since pure torsion can be caused only from shearing, the deformations theoretically take place without change in volume. Thus there are no transverse thermal currents and the internal friction is always lower than in tension or compression. A torsion-operated vibration oscillator such as the torsion-operated tuning fork of the invention, thus has certain advantages over any other oscillator having longitudinal, transverse or radial vibrations.

On the other hand, as perfect as possible a symmetry of the oscillator enables the areas having high stress concentration to be reduced or to disappear, and this symmetry is thus also favourable for low internal losses.

As for acoustic losses, with a tuning fork utilizing torsion, the radiation of the oscillator is nil. In fact, only relative rotations of the cross-sections occur. The maintaining circuit may be so designed that its radiation is negligible.

Whilst, in oscillators utilizing another type of vibration, it is necessary to take into account the friction resulting from the air moved by the vibrations, it must be noted that for a torsion-produced vibration the movement is laminar, thus having low friction. In any case, the dimensions of the oscillator may be influenced by using high density materials whereby these dimensions may be reduced, and consequently together with this the drawback of impediment due to friction.

It must also be noted that the suspension of the oscillator member, by means of a wire, enables the suspension losses to be considerably reduced. In fact, a support whatever it may be, constitutes an area causing a leakage of energy and is thus shown by an increase in the energy dissipation.

In one embodiment for operating the oscillator in ambient conditions of shocks and vibrations, the supporting wire is replaced by a thin disc which is integral with or secured to the central flexible member and located in the median plane thereof.

The fixing of the oscillator with respect to a frame, is effected by means of this disc and by means either of at least three shafts fixed to said frame, equidistant from one another and whose free end is engaged in corresponding dimples formed on the periphery of the disc, or of two diametrically opposed rigid clamps integral with or fixed to the frame and gripping the edge of the disc.

Moreover, a thinning of the central disc near the axis of the oscillator, reduces the mechanical resistance and improves the operation.

In another embodiment, the piezo-electric bilaminate strip is replaced by a piezo-electric monolaminate strip adhered to a metal plate, so as to locate the neutral axis in the joint, which may be of glue or cement.

This embodiment enables a mechanical housing to be mounted on the upper part of the oscillator and to obtain an actual frequency $f_2$, in flexion of the detector or pick-up, thus to effect a smaller damping of the main oscillator.

Finally, it enables an increased mechanical resistance to be given to the detector and energizing members.

If it is desired to render the oscillation almost insensitive to external shocks, it is necessary to produce a symmetrical assembly of the holding device, even with detectors and two energizing members.

Particularly, the two detectors or pick-ups are mounted so as to collect the torsional movement and to eliminate any signal resulting from accidental flexion vibration, due to shocks.

According to the invention, a supporting wire is housed at its two ends in a frame and carries, by means of at least one centering tube, an oscillator constituted by a flexible member connecting two oscillating masses, said member being subjected to the action of a torsion force maintained by at least one detector or pickup member and at least one energizing member, fixed on the oscillator, used in combination with an amplifying device.

According to another feature of the invention, the flexible member connecting the two oscillating masses comprises, in its median plane, a thin disc provided with equidistant dimples spaced along its periphery, in which the dimples are engaged by the ends of supporting shafts fixed by their other ends to said frame.

Figure 3:
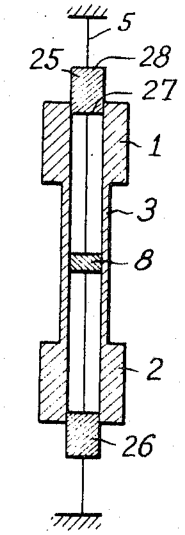
Figure 1:
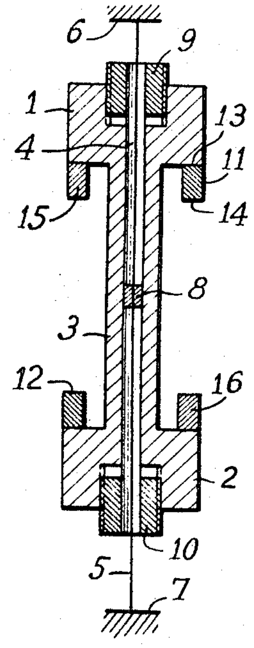
Figure 5:
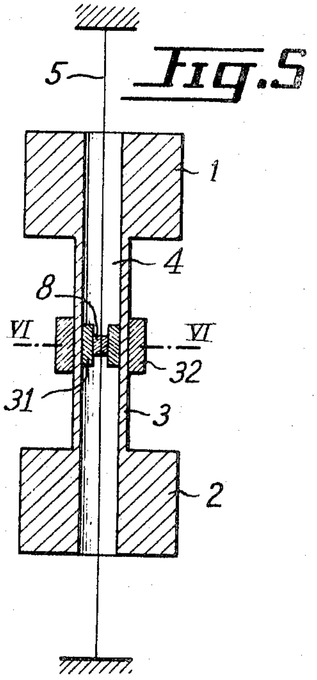
Figure 4:
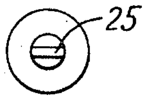
Figure 6:
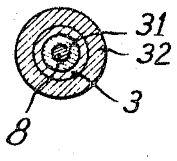
Figure 7:
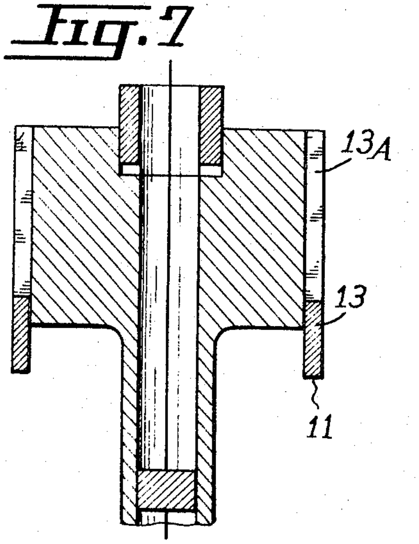
Figure 8:
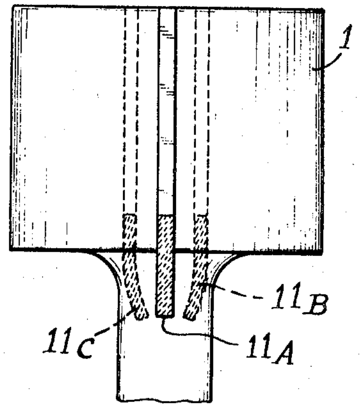
Figure 9:
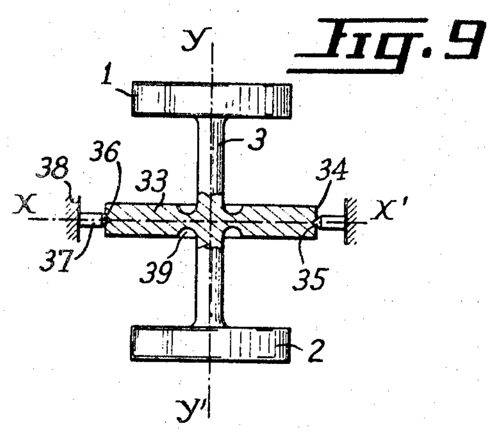
Figure 11:
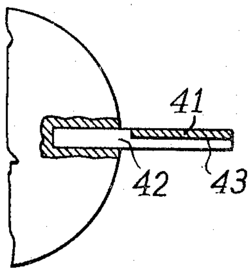
Figure 10:
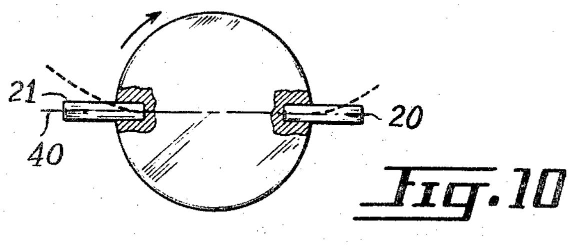
Figure 12:
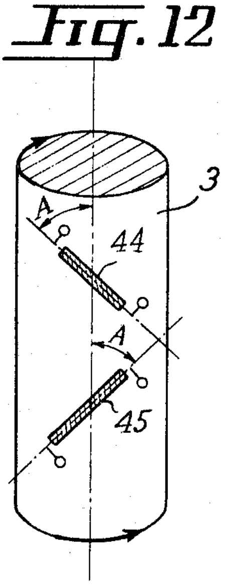
Figure 13:
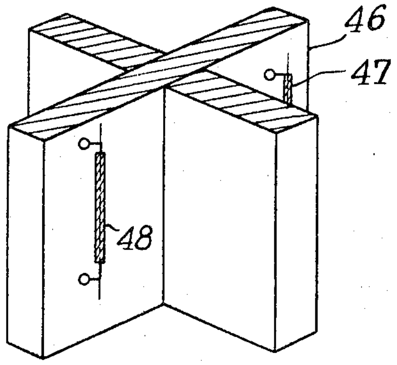

In order that the invention may be more clearly understood, reference will now be made to the accompanying drawings which show some embodiments thereof by way of example, and in which:

FIGURE 1 shows a longitudinal sectional view of a torsion-operated tuning fork provided with flexion detectors and energizing members, FIGURE 2 shows a view of a tuning fork fitted with two centering tubes, FIGURE 3 shows a longitudinal sectional view of a tuning fork fitted with a torsion detector and energizing member, FIGURE 4 shows an end view of the tuning fork of FIGURE 3, FIGURE 5 shows a longitudinal sectional view of a tuning fork in which the detector and the energizing members are constituted by torsion annuli or rings, FIGURE 6 shows a cross sectional view along the line VI—VI of FIGURE 5, FIGURE 7 shows a longitudinal sectional view to a large scale of a method of fixing a bilaminate flexion element on the oscillator, FIGURE 8 is a diagrammatic view showing the deformations of a bilaminate flexion element mounted on the oscillator, FIGURE 9 shows an elevational view partially in section of a torsion-operated tuning fork provided with a supporting disc, FIGURE 10 shows a view of the detector and energizing members constituted by piezo-electric bilaminate elements, FIGURE 11 shows a view of a detector or energizing member constituted by a piezo-electric monolaminate element fixed on a metal plate, FIGURE 12 shows a view of a portion of a circular, flexible member, on which strain gauges are fixed, and FIGURE 13 shows a view of a portion of a cruciform flexible member on which strain gauges are fixed.

Referring now to the drawings, the tuning fork shown in FIGURE 1 comprises an oscillator, constituted by two cylindrical, oscillating masses, 1, 2 which are connected by a flexible tube 3, which may be deformed by torsion, but it will be apparent that the tube may be replaced by a flexible shaft.

The masses 1, 2 may be obtained by machining the mass so as to form only one piece with the central part, or may be worked and made etc., particularly of high density metal alloys having such as Inermet, Ponderal or Elinvar. The tube 3 may be made in particular of a metal alloy having an adjustable thermo-flexible coefficient (Elinvar for example), of a nickel-chrome alloy (80 parts Ni to 20 parts Cr), aluminium or Duralumin, silica glass or quartz.

The tube 3 and the two oscillating masses 1, 2 have a central bore 4 opening out at the two ends, through which axially passes a wire 5, preferably made of nickel-chrome (80/20) or Phynox or bronze. This wire 5 is rigidly housed at its two ends 6, 7 in a frame which is not shown on the drawing, and it has fixed thereto along its length, a centering tube 8 fixed in the median part of tube 3 near a rotation node.

The centering tube is preferably made of metal, plastics material or rubber.

The oscillator constituted by the tube 3, and the masses 1, 2 is energized in torsion by energizing members to be described later.

In operation, the two masses 1, 2 have rotation antinodes and vibrate in perfect phase opposition, because the assembly admits only a single torsion frequency $f_0$, with the essential condition that no rotation node may be imparted by any mechanical connection, along the flexible tube 3.

The wire 5 and the oscillator constituted by the tube 3 and the two masses 1, 2 form a second torsion oscillator of frequency $f_1$ and it is always desired to obtain a frequency $f_1$ which is much lower than $f_0$ as this may be obtained very easily.

In this way, this arrangement has two very important advantages, firstly that the main oscillator transmits to the support only a very low part of its energy. For example in the case where the ratio $f_0/f_1$ is near 100, the insulating factor is of the order of $10^{-4}$.

Secondly, the suspension thus formed, constitutes an excellent mechanical filter and the main oscillator consequently has a very great insensitivity to disturbances. Suitably arranged stops (not shown on the drawing) prevent the wire 5 from vibrating at dangerously high amplitudes.

The final adjustment of the frequency $f_0$ of the oscillator is easily obtained by known methods and particularly in FIGURE 1, by means of weights 9, 10, which enable adjustment to be effected by screwing the weights in or out.

FIGURE 1 shows two detectors 11, 12 constituted by piezo-electric flexion bilaminate strips arranged symmetrically with respect to the torsion axis and one of the ends 13 of which is rigidly fixed to the masses 1, 2 of the oscillator, while the end 14 is free.

The detectors are preferably located near a displacement antinode. In the same way, the energizing members 15, 16 also constituted by piezo-electric flexion bilaminate strips, are arranged symmetrically with respect to the detectors 11, 12 and fixed in the same way as the latter.

FIGURE 7 shows a method of fixing a detector flexion bilaminate strip, such as 11, the end 13 of which is housed in a groove 13A made in the mass 1.

The flexion of the bilaminate detector such as 11, is shown in FIGURE 8; 11A indicates the position of the bilaminate strip at rest and the positions 11B and 11C correspond to the positions of maximum rotation amplitudes of the oscillator.

The flexion bilaminate strips are dimensioned so as to work as an absolute acceleration detector.

The detectors and energizing members are connected to an electronic amplifying device of a known type, by means of fine wires arranged so as to offer a minimum disturbance to the operation of the oscillator.

The tuning fork shown in FIGURE 2 is constituted by a tube 3 integral with or secured at its extremities to two oscillating masses 1, 2; the oscillator thus formed is fixed to the frame by means of a wire 17 as in the embodiment hereinabove described but there are used in this case two centering tubes 18, 19 which are fixed to the extremities of the tube 3 near the rotation antinodes.

On the other hand, a single detector 20 constituted by a piezo-electric flexion bilaminate strip member is fixed by one of its ends to the oscillating mass 1, whilst its other end is free.

An exciting or energizing member 21 is secured to the mass 1 of the oscillator, symmetrically to the detector member 20.

FIGURES 3 and 4 show another modification of the torsion-operated tuning fork similar to that shown in FIGURE 1, in which the bilaminate flexion members constituting the detectors and the energizing members are replaced by piezo-electric torsion bilaminate elements 25, 26 which are rigidly fixed by one end such as 27 on the head 1 for the detector 25 whose end 28 is free. In this case, the detector and the energizing member are disposed so as to present their measuring axis in such a manner that it shall be merged or aligned with that of the oscillator. This connection is effected in the vicinity of a rotation antinode of the oscillator.

FIGURES 5 and 6 show another embodiment of the tuning fork of FIGURE 4 in which the torsion laminate constituting the detector and the energizing member are replaced by piezo-electric torsion rings. In this case, one of the rings 31 is fixed to the interior of central bore 4 by its exterior wall and it receives therewithin the centering tube 8 to which it is fixed. The other ring 32 is fixed on the exterior wall of the tube 3 which it surrounds. The piezo-electric torsion rings are fixed by their two ends and situated preferably in the vicinity of a rotation node of the oscillator in the median part of the tube 3.

As for the flexion bilaminate elements, there may also be an electronic amplifying device of known kind which connects the detector and the energizing member constituted by the piezo-electric torsion members.

On the other hand, there may equally be used any kind of magnetic or capacitive circuit known per se providing two opposed forces in such a manner that the detector and the energizing member can be suspended from the same wire as the oscillator itself.

In the embodiment shown in FIGURE 9, the tuning fork is constituted, as previously, by two oscillating masses 1, 2 of cylindrical shape which are connected by a flexible member 3 particularly constituted by a flexible tube or shaft.

In the median plane X–X' of the oscillator perpendicular to the axis Y–Y' of the flexible member 3, the member is provided with a thin disc 33 whose peripheral edge 34 has at least three dimples 35 disposed mutually at 120°, and in which are located the tapered ends 36 of at least three shafts 37, of which only two are shown in the drawing. The shafts 37 are fixed to the frame 38.

In another embodiment, the three supporting shafts 37 may be replaced by two rigid diametrically opposed clamps which are fixed to the frame 38, the edges of the disc 33 being gripped by the clamps.

Other fixing means may also be utilized but they must be formed in such a manner as to conform to the symmetry of the tuning forks by reference to the median plane X—X which corresponds to the nodes of displacement and rotation.

On the other hand, the central disc 33 may have a reduced or thinned portion 39 in the vicinity of the axis Y—Y—creating a diminution of the mechanical resistance which is favorable to operation.

In the embodiment shown in FIGURE 10, the detector 20 and the energizing member 21 are constituted by piezo-electric bilaminate elements mounted in the form of an accelerometer. The neutral axis 40 of the bilaminate elements is shown in dotted lines for the positions taken by the detector and the energizing member during the movement, and in a long interrupted line for the deformation due to the motive maintaining tension acting on the energizing member 21.

In FIGURE 11 is shown a modification in which the detectors and energizing members are constituted by a monolaminate piezo-electric element adhered to a metal plate or blade 42 deeply housed or buried in the oscillator. The neutral axis 43 of the detector and energizing members is situated in the joint which may be of an appropriate cement.

In another embodiment, the maintaining means is constituted by a relative deformatory detector and an absolute piezo-electric energizing member mounted in the fashion of an accelerometer, this latter being made on the same principle as the maintaining member previously described.

As previously, the detector and the energizing member are connected exteriorly to a known amplifying device.

The deformation detector has the very important advantage of eliminating from the output signal the vibrations currently collected by the absolute detector when the oscillator is subjected to external vibratory fields. The relative deformation detector is constituted by a strain gauge of semi-conductor material fixed on the deformable flexible member of the oscillator 3.

In FIGURE 12 there is shown a portion of the flexible deformable member 3 whose section is circular, two strain gauges of semi-conductor material 44 and 45 being fixed on the member 3 with their sensitive axis located at an angle A of 45° to the longitudinal axis perpendicular to the cross-section of the member 3.

The two gauges are disposed in such a manner as to collect the torsion information and to eliminate all signals coming from a flexion deformation of the deformable flexible member.

In FIGURE 13, the cross-section of the deformable flexible member 46 is cruciform and the two semi-conductor gauges 47 and 48 are fixed by orienting their measuring axis to the longitudinal axis perpendicular to the cross-section.

A flexible member having a cruciform cross-section has been shown but it would be the same if the section were rectangular or V-shaped.

The two gauges 47 and 48 are equally disposed to collect a signal due to the deformation by torsion and to eliminate all signals due to deformation by flexion.

We claim:

1. A torsion-operated turning fork, comprising a pair of spaced frame members, a wire having its two ends secured in said frame members, at least one centering tube mounted about said wire, an oscillator supported on said at least one centering tube, said oscillator being constituted by a flexible member interconnecting two oscillatory masses, at least one detector member and at least one energizing member fixed on said oscillator for imparting to said flexible member a torsion force and maintaining said force thereon, and an amplifying device operatively connected to said tuning fork.

2. A tuning fork according to claim 1, wherein said flexible member is a tube carrying at its two ends two oscillatory masses and through which said wire passes, said at least one centering tube mounted about said wire near the rotation node.

3. A tuning fork according to claim 1, wherein said flexible member is a tube in which said wire is fixed by two centering tubes, located adjacent said oscillatory masses in the area of the rotation antinodes.

4. A tuning fork according to claim 1, wherein said energizing member and said detector member are each constituted by a bilaminate flexion element one end of which is fixed on said oscillator, and whose other end is free.

5. A tuning fork according to claim 1, wherein said energizing member and said detector member are each constituted by a torsion bilaminate element, having a measuring axis merged with that of the oscillator and one of the ends of which is fixed to said oscillator near a rotation antinode, and the other end of which is free.

6. A tuning fork according to claim 1, wherein said energizing member and said detector member are each constituted by a torsion bilaminate element, presenting a measuring axis merged with that of the oscillator and whose two ends are fixed to said oscillator near a rotation node.

7. A tuning fork according to claim 1, wherein said energizing member and said detector member are each constituted by a torsion ring, the axis of which is merged with that of the oscillator and whose two ends are fixed to said oscillator near a rotation node.

8. A torsion operated tuning fork, comprising a frame member, an oscillator including a flexible member connecting a pair of oscillatory masses at each end of the flexible member, a thin disc in the median plane of the flexible member, said thin disc having a plurality of equidistant dimples spaced around its periphery, a plurality of supporting shafts, engaged in said dimples, said shafts being fixed by their other ends in said frame member, at least one detector member and at least one energizing member fixed on said oscillator for imparting to said flexible member a torsion force and maintaining said force thereon.

9. A tuning fork according to claim 8, wherein said supporting disc is gripped on its edges by rigid, diametrically opposite clamps, said clamps being fixed to said frame member.

10. A tuning fork according to claim 8, wherein said thin disc has a reduced portion in its central part, adjacent the axis of the oscillator.

11. A tuning fork according to claim 8, wherein said energizing member and said detector member are each constituted by a piezo-electric monolaminate element secured to a metal plate and embedded for an appreciable depth in said oscillator, the neutral axis of said members being located in the joint between said piezo-electric monolaminate and said metal plate.

12. A tuning fork according to claim 8, wherein said relative deformation detector is constituted by two strain gauges fixed to said flexible member, said flexible member having a circular cross-section, the axes of said strain gauges being oriented at 45° with respect to the longitudinal axis of said flexible member.

13. A tuning fork according to 8, wherein said relative deformation detector is constituted by two strain gauges fixed to said flexible member, said flexible member having a cross-section selected from the group consisting of cruciform, rectangular and V-shaped, the axes of said strain gauges being oriented with their measuring axis parallel to the longitudinal axis of said flexible member.

References Cited

UNITED STATES PATENTS

| | | | |
|---|---|---|---|
| 2,514,250 | 7/1950 | Meredith | 73—505 |
| 3,302,456 | 2/1967 | Mathey | 73—505 |
| 3,309,929 | 3/1967 | Simmons et al. | 73—505 |

RICHARD B. WILKINSON, *Primary Examiner.*

L. R. FRANKLIN, *Assistant Examiner.*

U.S. Cl. X.R.

331—155